United States Patent
Hay

(12) 
(10) Patent No.: US 6,314,987 B1
(45) Date of Patent: Nov. 13, 2001

(54) ASEPTIC PRODUCT DISCHARGE VALVE AND METHOD

(75) Inventor: Lloyd F. Hay, Oakdale, CA (US)

(73) Assignee: FMC Corporation, Chicago, IL (US)

( * ) Notice: Subject to any disclaimer, the term of this patent is extended or adjusted under 35 U.S.C. 154(b) by 0 days.

(21) Appl. No.: 09/608,247

(22) Filed: Jun. 30, 2000

(51) Int. Cl.[7] ............... B08B 3/00; B08B 9/027; F16K 51/00
(52) U.S. Cl. .......... 137/241; 134/102.1; 134/166 C; 134/171; 137/15.04
(58) Field of Search .......... 134/102.1, 166 C, 134/171; 137/240, 241, 15.06, 15.04, 15.05; 251/63, 63.5, 63.6

(56) References Cited

U.S. PATENT DOCUMENTS

| | | | | |
|---|---|---|---|---|
| 646,103 | * | 3/1900 | Faber | 137/240 |
| 646,104 | * | 3/1900 | Faber | 137/240 |
| 721,453 | * | 2/1903 | Lunken | 137/241 |
| 870,487 | * | 11/1907 | Bertram | 137/240 |
| 1,358,968 | * | 11/1920 | Mattern et al. | 137/240 |
| 1,780,525 | | 11/1930 | Jacobsen | 137/241 |
| 1,831,457 | | 11/1931 | Larsen | 137/241 |
| 1,954,217 | | 4/1934 | Morrow | 137/241 |
| 2,254,472 | * | 9/1941 | Dahl | 137/240 |
| 2,378,607 | * | 6/1945 | Watts | 137/240 |
| 2,682,277 | * | 6/1954 | Marshall et al. | 137/240 |
| 2,698,120 | | 12/1954 | Fairchild | 137/241 |
| 3,633,607 | * | 1/1972 | Werra | 137/241 |
| 3,643,679 | | 2/1972 | Hansson | 137/241 |
| 3,998,589 | * | 12/1976 | Rechtsteiner et al. | 422/28 |
| 4,037,784 | | 7/1977 | Sabarly | 236/56 |
| 4,144,901 | * | 3/1979 | Stevenson | 137/240 |
| 4,160,002 | | 7/1979 | Janovtchik | 261/76 |
| 4,325,401 | | 4/1982 | Ukai et al. | 137/240 |
| 4,614,661 | | 9/1986 | White et al. | 426/511 |
| 4,913,185 | * | 4/1990 | Mattei | 137/241 |
| 5,058,619 | | 10/1991 | Zheng | 137/240 |
| 5,152,500 | | 10/1992 | Hoobyar et al. | 251/269 |
| 5,193,571 | | 3/1993 | Levati | 137/241 |
| 5,311,899 | | 5/1994 | Isayama et al. | 137/240 |
| 5,395,569 | | 3/1995 | Badertscher et al. | 261/62 |
| 5,439,024 | | 8/1995 | Zimmerly | 137/241 |
| 5,746,239 | | 5/1998 | Ondrus | 137/240 |
| 5,863,587 | | 1/1999 | Badertscher et al. | 426/511 |
| 5,881,574 | | 3/1999 | Petrich | 62/616 |
| 5,927,318 | | 7/1999 | Ishibashi et al. | 137/240 |

* cited by examiner

*Primary Examiner*—George L. Walton
(74) *Attorney, Agent, or Firm*—Wood, Herron & Evans, L.L.P.

(57) ABSTRACT

An aseptic product discharge valve and related methods for injecting steam into a sterile fluid delivery system used to transport a sterile fluid food product. The aseptic product discharge valve includes a tubular member having a longitudinal passageway and an outlet for discharging the flow of food product. The valve also includes a chamber disposed radially outward of the passageway. The chamber receives steam that is exhausted through an opening disposed adjacent to the valve. A valve member is disposed within the longitudinal passageway and fluid food product must flow about the valve member. The diverted flow of fluid food product may be intersected by the flow of injected steam. The tubular body further includes a valve seat which is bathed with the injected steam to promote sterility at the discharge location.

16 Claims, 3 Drawing Sheets

ASEPTIC PRODUCT DISCHARGE VALVE AND METHOD

FIELD OF THE INVENTION

The present invention relates generally to aseptic valves and, more particularly, to an aseptic product discharge valve and related methods of preventing contamination of a fluid food product processing system by microorganisms.

BACKGROUND OF THE INVENTION

Many fluid food products are aseptically processed to prevent the undesirable effects of microorganism. Aseptic processing can significantly extend the shelf life of most foodstuffs and often involves the continuous sterilization of a fluid food product circulated within a closed process system. In a typical aseptic process, a fluid food product is thermally pasteurized by heating to an elevated temperature for a duration sufficient to reduce the viability of microorganism to acceptable levels. Following pasteurization, the fluid food product is typically transported through a cooling media before packaging into a sterile container. One example of such a system is shown and described in U.S. Pat. No. 5,802,96, which is assigned to the assignee of the present invention. In most processing and packaging operations, the cooling side of the system is much more prone to contamination by microorganism. One potential point of contamination is the occasional requirement to draw off a quantity of sterile product or other media from the sterile atmosphere of an aseptic cooling system to an unsterile atmosphere, such as an open tank or gutter. Over time, microorganisms can migrate up the discharge line and contaminate the system.

Conventional valves produce a fluid tight seal between a movable valve member and a complementary valve seat so as to discontinue or restrict flow. Absent suitable precautions, microorganisms resident in the discharge line downstream of the discharge valve can readily traverse the fluid-tight seal, invade the sterile piping system, and compromise the sterility of the closed process system.

Various manners of dealing with contamination issues in food processing systems have been utilized in the past. One typical system is a double block and bleed valve system which involves using two spaced apart valves in the discharge line with steam injection between the two valves. The valves are sequentially opened and timed with the introduction of stream to maintain sterility at the outlet. Unfortunately, this type of system is rather complicated and still may not maintain optimum sterility at the discharge location.

It would therefore be desirable to provide a product discharge valve, especially useful in the fluid food product industry, which combines simplicity of design with effective sterilization of the discharge location.

SUMMARY OF THE INVENTION

The present invention provides an aseptic product discharge valve that injects steam adjacent the interface between a valve member and an associated valve seat. The aseptic product discharge valve includes a tubular structure having a longitudinal passageway with an outlet for discharging the flow of the fluid food product. The valve further includes a chamber that is positioned radially outward of the longitudinal passageway and a steam conduit for supplying steam to the chamber. In one embodiment, the chamber is an annular chamber having an annular opening into the longitudinal passageway. The valve member may be moved by an actuating assembly configured to move the valve member between a closed position to prevent the flow of fluid food product through the outlet and at least one open position to allow the flow of fluid food product through the outlet. The actuating assembly may be a linear actuator coupled with the valve member by a valve stem.

The aseptic product discharge valve further includes a hollow valve stem having a cavity for receiving steam and a number of radial ports that perforate the hollow member. Steam at super-atmospheric pressure is delivered from a steam conduit attached for fluid communication with the valve stem that supplies steam to fill the cavity. The radial steam ports allow steam to bathe the full circumference of the downstream surface of the valve member. The steam injected from the opening in the annular chamber bathes the valve seat and the upstream surface of the valve member. The multiple steam injection locations form a barrier to the migration of microorganisms either along the inner surface of the discharge conduit or the outer surface of the valve stem, past the interface between the valve member and the valve seat.

Additional features, advantages and objectives of the invention will become more readily apparent to those of ordinary skill in the art upon review of the following detailed description of the preferred embodiments, taken in conjunction with the accompanying drawings.

DETAILED DESCRIPTION OF THE PREFERRED EMBODIMENTS

Figure 1A:
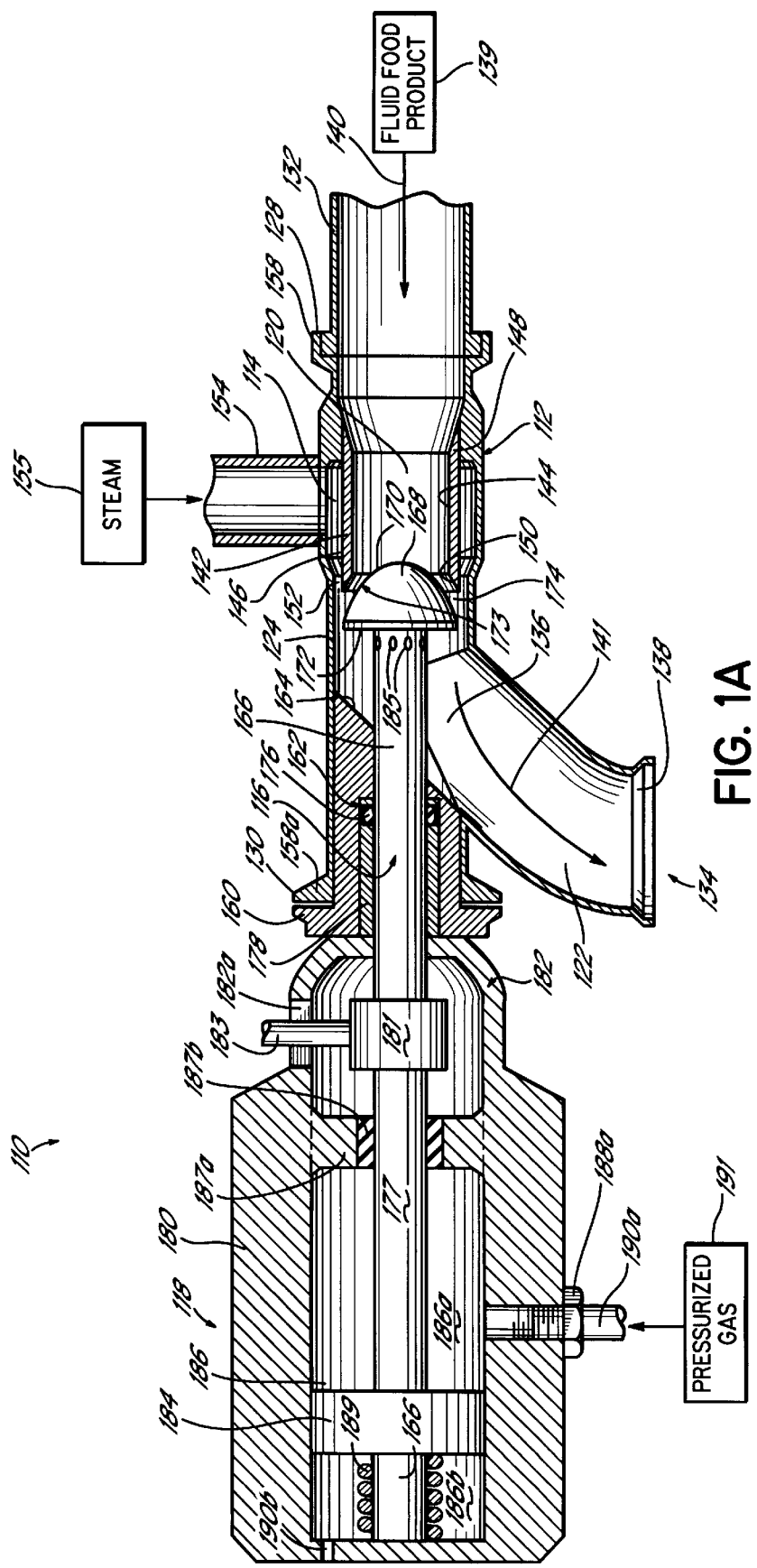
FIG. 1A is a side view of an aseptic product discharge valve constructed in accordance with a preferred embodiment of the invention.
Figure 1B:
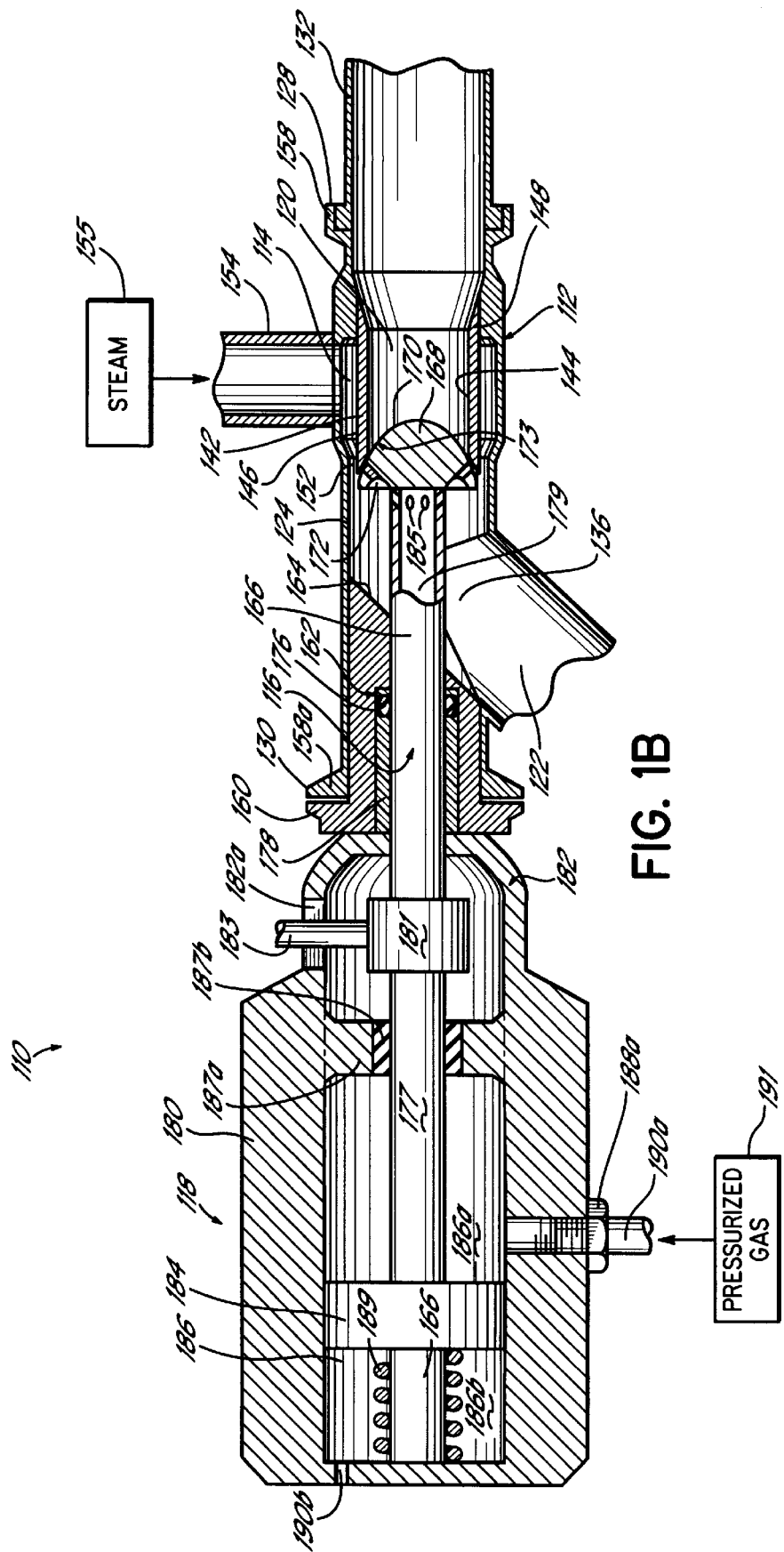
FIG. 1B is a side view of the embodiment shown in FIG. 1A, in which the flow of fluid food product has been blocked.
Figure 2:
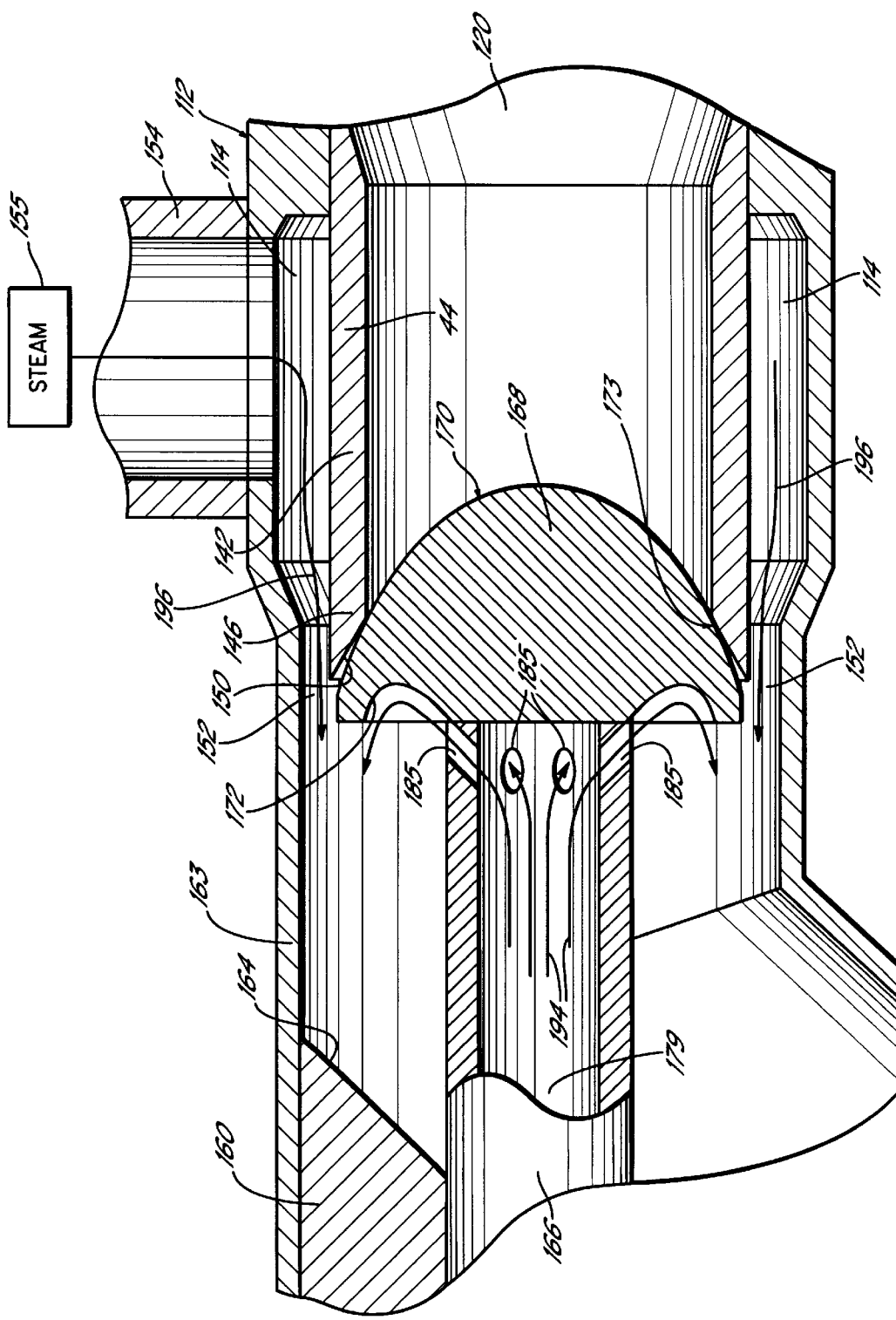
FIG. 2 is an enlarged, fragmentary side view of FIG. 1A showing a section of the aseptic product discharge valve.

FIGS. 1A, 1B and 2 show side axial cross sections of an aseptic valve, in accordance with the principles of the present invention, wherein the aseptic valve is configured to operate as an aseptic product discharge valve 110. Referring to FIG. 1A, aseptic product discharge valve 110 generally includes a tubular body 112 featuring an internal annular chamber 114 that adapted to receive steam for injection, a valve assembly 116 disposed within tubular body 112, and a valve actuator 118 attached to an opposite end of valve assembly 116.

Tubular body 112 includes a longitudinal passageway 120 coupled for fluid communication with a passageway 122. Longitudinal passageway 120 is an open space enclosed, in part, by a cylindrical wall 124 and extends along a longitudinal axis from a first up stream end 128 to a second downstream end 130. Passageway 122 extends along a curvilinear axis toward an outlet 1 24 to an opening 130 in cylindrical wall 124. First upstream end 128 of longitudinal passageway 120 is attached to a delivery conduit 132 for receiving a flow of a sterile fluid food product from a supply 139, as shown by arrow 140. Passageway 122 accepts fluid food product discharged from longitudinal passageway 120, redirects the flow by approximately 90°, and exhausts the redirected flow through outlet 134 as shown by arrow 141. Outlet 134 is circumscribed by an integral flange 138 adapted to attach in a fluid-tight manner to a complementary flanged end carried by a discharge conduit (not shown).

An inner tubular member 142 is disposed within longitudinal passageway 120. In the embodiment shown in FIG. 1A, inner tubular member 142 is substantially coaxial and substantially concentric with longitudinal passageway 120. Inner tubular member 142 includes a generally cylindrical wall 144 disposed radially inward from cylindrical wall 124 and has a first end 146 spaced apart from a second end 148. A frustoconical rim or end 150 encircles the inner circumference of inner tubular member 142 near first end 146. Rim 150 provides an annular beveled edge that functions as a valve seat, as will be dicussed below.

Annular chamber 114 comprises an open steam-receiving volume surrounding inner tubular member 142. Second end 148 of inner tubular member 142 is circumferentially sealed in a fluid-tight fashion with the interior of cylindrical wall 124. Annular chamber 114 includes an annular opening 152 disposed radially outward of frustoconical rim 150. A steam conduit 154 penetrates cylindrical wall 124 to supply annular chamber 114 with steam at a super-atmospheric pressure generated by a remote steam source 155.

Cylindrical wall 124 further includes integral flanges 158, 158a at respective first and second opposite ends 128, 130 that make a fluidtight seal with a Complementary flange. End 130 receives a flanged insert 160 having a central stepped bore 162 and a curvilinear interior face 164. Angled face 164 sustains the streamline flow of fluid food product into passageway 122. Fluid food product 139 that has been pasteurized upstream from valve assembly 116 to eliminate or substantially reduce entrained microorganisms is discharged from outlet 134.

Valve assembly 116 is disposed within longitudinal passageway 120 and includes a valve stem 166 attached to the base of a valve member 168. Valve member 168 includes a bulbous rounded surface 170 on the upstream side and an annular cusped surface 172 on the downstream side. Of course, the shapes and contours of surface 170 and surface 172 are not intended to be limiting in any way and may be varied without departing from the scope and spirit of the present invention. Valve member 168 is preferably composed of a stainless steel that can tolerate both the wear associated with the streaming food product and injected steam and the direct heat of the injected steam.

A portion of bulbous rounded surface 170 presents a sealing surface 173 that sealingly engages frustoconical rim 150 (FIG. 2) or, when separated from rim 150, forms pathway 174. Fluid food product emerges from annular pathway 174 as a thin diverging annular flow of fluid food product. The width of pathway 174 will contribute to establishing the flow rate of fluid food product through aseptic product discharge valve 110 and the radial thickness of the diverging annular flow. It may be appreciated by one of ordinary skill in the art that other geometrical configurations and shapes of sealing surface 173 and rim 150 are possible for varying the configuration of pathway 174, the relative positioning of opening 152, and the relative direction of the flow path of fluid food product without departing from the spirit and scope of the present invention.

Valve stem 166 extends axially away from an attachment point near the center of valve member 168 and through stepped bore 162. A hollow bushing 178 is coaxially received within the larger diameter portion of stepped bore 162. An O-ring 176 is carried by a circumferential groove formed in the inner surface of bushing 178. O-ring 176 compressively engages a length of the outer surface of valve stem 166 to form a substantially fluid-tight dynamic seal. An opposite end of valve stem 166 is connected to an actuator finger 177 of valve actuator 118.

As shown in FIG. 1B, valve stem 166 may further include a longitudinal cavity 179. Steam is delivered at a super-atmospheric pressure to cavity 179 via a steam conduit 183 through a fitting 183. A slot 182a allows back and forth movement of conduit 183. Valve stem 166 further includes a plurality of radial steam ports 185 that vent s team outwardly from internal cavity 179 so that cusped surface 172 is bathed by steam.

Valve actuator 118 includes an outer housing 180 that attaches to flanged insert 160. An opposite end of actuator finger 177 connects to a piston 184 that bisects a chamber 186 enclosed within outer housing 180 into two portions 186a, 186b. Portion 186a includes a fitting 188a that extends through outer housing 180. Fitting 188a is adapted to supply or exhaust pressurized gas through a conduit 190a coupled to a source 191 of the pressurized gas. A vent 190b is provided to vent air from chamber portion 186b.

If pressurized gas fills chamber portion 186a as depicted in FIG. 1A, piston 184 will urge valve assembly 116 and separate valve member 168 from frustoconical rim 150 against the bias of a spring 189 in chamber portion 186b. A ring 187a may be welded within housing 180 to carry a seal 187b engaged with finger or rod 177 to allow air pressure to build in chamber portion 186a. When the pressurized gas is exhausted as depicted in FIG. 1B, valve assembly 116 will be forced by spring 189 in an opposite direction so that valve member 168 contacts rim 150 and the flow of fluid food product is at least substantially blocked. In such a contacting state, sufficient force must be applied to piston 184 so as to resist the countervailing force applied by the static pressure of food product located upstream of valve member 168.

FIG. 2 schematically illustrates the flows of fluid food product and steam through a segment of longitudinal passageway 120 proximate to valve member 168. In operation, fluid food product that has been sterilized is received by conduit 132. When valve assembly 116 is actuated to a closed position, a steam is admitted into internal cavity 179 and into annular chamber 114. Alternatively, steam may be continuously admitted into internal cavity 179 regardless of whether valve assembly 116 is actuated to a closed position or an open position. If the steam is draining under gravity to a waste receptacle, steam must be provided to annular chamber 114 at a pressure of greater than about 5 psi to establish a positive flow of steam. However, a greater pressure of steam may be required if the flow must overcome a hydrostatic barrier.

Steam exits annular opening 152 as a thin annular flow that bathes the backside of frustoconical rim 150 and a peripheral annulus of bulbous rounded surface 170. The flow of steam is indicated by arrows 196. Steam is simultaneously emitted as indicated by arrows 194, from each radial steam port 185 to bathe annular cusped surface 172. The two converging baths of steam form an effective thermal barrier. The steam also eliminates or aseptically reduces microorganisms migrating from the discharge line into passageway 122. The pressure and temperature of steam in steam conduits 154, 183 (FIG. 1B) may be regulated by valves interfaced with control circuitry (not shown). While not shown, it will be appreciated that the control circuitry is well known to one of ordinary skill in the art and includes appropriate components for operating aseptic product discharge valve 110.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus, and illustrative examples shown and described. Accordingly, departures may be made from such details without departing from the spirit or scope of applicant's general inventive concept.

The scope of the invention itself should only be defined by the appended claims, wherein I claim:

1. An aseptic product discharge valve for use in a fluid delivery system for a fluid food product, the aseptic product discharge valve comprising:

a tubular structure including a longitudinal passageway having respective upstream and downstream ends, the upstream end comprising an inlet for receiving a flow of the fluid food product and the downstream end comprising an outlet for discharging said fluid food product;

a valve seat disposed in said longitudinal passageway downstream of said outlet, said valve seat facing the downstream end;

a movable valve member mounted within said longitudinal passageway downstream of said valve seat, said valve member positioned for selective sealing engagement with said valve seat;

a walled chamber disposed radially between said tubular structure and said longitudinal passageway, the chamber having an opening disposed at a radially outward, adjacent location relative to said valve seat; and a steam conduit attached for fluid communication with said chamber for supplying steam to said chamber such that the steam exits at the opening of said chamber and contacts at least one of the valve seat and the upstream portion of said valve member.

2. The aseptic product discharge valve of claim 1, wherein said movable valve member includes a valve stem and wherein said chamber is an annular chamber disposed about the longitudinal passageway and said opening is an annular opening generally circumscribing said valve seat.

3. The aseptic product discharge valve of claim 2, further comprising an actuating assembly coupled with said valve member, said actuating assembly configured to move the valve member between a closed position to prevent the flow of said fluid food product through the outlet and at least one open position to permit the flow of said fluid food product through the outlet.

4. The aseptic product discharge valve of claim 2, further comprising a plurality of steam ports in said valve member, each steam port configured to receive and direct steam at the upstream portion of said valve member.

5. The aseptic product discharge valve of claim 1, wherein said valve member further includes steam ports configured to receive and direct steam at said valve seat when said valve member is in sealing engagement with said valve seat.

6. The aseptic product discharge valve of claim 1, wherein the downstream end of the longitudinal passageway has a linear portion and a curvilinear portion intersecting with the linear portion and extending outwardly therefrom, the linear portion receiving said movable valve member therein and the outlet of the longitudinal passageway being within the curvilinear portion.

7. An aseptic product discharge valve for maintaining the sterility of an aseptic process for a fluid food product, the discharge valve comprising:

a tubular structure including a longitudinal passageway having respective upstream and downstream ends, the upstream end comprising an inlet for receiving a flow of the fluid food product and the downstream end comprising an outlet for discharging said fluid food product;

a valve seat disposed in said longitudinal passageway upstream of said outlet, said valve seat facing the downstream end;

a movable valve member mounted within said longitudinal passageway downstream of said valve seat, said valve member facing said valve seat for selective sealing engagement with said valve seat;

a walled chamber disposed radially between said tubular structure and said longitudinal passageway, said chamber having an opening disposed radially outward of said valve seat;

a steam conduit attached for fluid communication with said chamber for supplying steam to said chamber such that the steam exits at the opening of said chamber downstream of the valve seat; and a valve stem attached to said valve member, said valve stem having a cavity therein for receiving steam and at least one steam port communicating with said cavity and configured to direct steam from said cavity generally toward said valve member.

8. The aseptic product discharge valve of claim 7, wherein said chamber is an annular chamber disposed about the longitudinal passageway and said opening is an annular opening generally circumscribing said valve seat.

9. The aseptic product discharge valve of claim 8, further comprising an actuating assembly coupled with said valve stem, said actuating assembly configured to move the valve member between a closed position to prevent the flow of said fluid food product through the outlet and at least one open position to permit the flow of said fluid food product through the outlet.

10. The aseptic product discharge valve of claim 8, further comprising a plurality of steam ports in said valve stem, each steam port communicating with said cavity and configured to direct steam at a different portion of said valve member.

11. The aseptic product discharge valve of claim 7, wherein said valve member further includes steam ports configured to receive and direct steam at said valve seat when said valve member is in sealing engagement with said valve seat.

12. The aseptic product discharge valve of claim 7, wherein the downstream end of the longitudinal passageway has a linear portion and a curvilinear portion intersecting with the linear portion and extending outwardly therefrom, the linear portion receiving said movable valve member therein and the outlet of the longitudinal passageway being within the curvilinear portion.

13. A method for maintaining sterile conditions at a valve configured to discharge a fluid food product from a food processing system, the valve comprising a movable valve member and a valve seat disposed in a discharge passageway having respective upstream and downstream ends, the valve member coupled to a stem having an interior cavity for receiving steam and at least one port communicating with the interior cavity, and a chamber disposed radially between the discharge passageway and an outer tubular structure, the chamber including an opening which is positioned generally adjacent the valve seat, the method comprising:

supplying a flow of the fluid food product into the upstream end of the discharge passageway;

directing the flow of the fluid food product around the valve member toward the downstream end of the discharge passageway;

injecting steam through the opening and adjacent the valve seat into contact with the valve seat and an upstream portion of the valve member; and injecting steam through the at least one port of the valve stem and into contact with a downstream portion of the valve member.

14. The method of claim 13, wherein the injecting step further comprises:

injecting the steam in an annular path around and adjacent the valve seat.

15. The aseptic product discharge valve of claim 10, wherein said valve member has an upstream valve seat engageable surface for selective sealing engagement with said valve seat, said valve member having a downstream concave surface with a periphery adjacent the valve seat engageable surface, and wherein said steam ports direct steam onto said concave surface whereupon steam merges with steam emerging from the opening of said chamber to establish therewith an effective thermal barrier.

16. The method of claim 13, further comprising, before the steps of injecting steam, engaging the valve member with the valve seat to stop the flow of the fluid food product through the discharge passageway.

\* \* \* \* \*